US009258099B2

(12) United States Patent
Aboul-Magd et al.

(10) Patent No.: US 9,258,099 B2
(45) Date of Patent: Feb. 9, 2016

(54) SYSTEM AND METHOD FOR USER COOPERATION PROTOCOL FOR INTERFERENCE ALIGNMENT IN WIRELESS NETWORKS

(71) Applicant: Huawei Technologies Co., Ltd., Shenzhen (CN)

(72) Inventors: Osama Aboul-Magd, Kanata (CA); Jung Hoon Suh, Kanata (CA); Kwok Shum Au, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 14/064,932

(22) Filed: Oct. 28, 2013

(65) Prior Publication Data

US 2014/0119300 A1 May 1, 2014

Related U.S. Application Data

(60) Provisional application No. 61/719,808, filed on Oct. 29, 2012.

(51) Int. Cl.

*H04L 5/00* (2006.01)
*H04J 11/00* (2006.01)
*H04W 74/08* (2009.01)
*H04B 7/04* (2006.01)
*H04B 7/02* (2006.01)

(52) U.S. Cl.

CPC ............ *H04L 5/0057* (2013.01); *H04B 7/0452* (2013.01); *H04J 11/0053* (2013.01); *H04L 5/0073* (2013.01); *H04W 74/0808* (2013.01); *H04B 7/024* (2013.01)

(58) Field of Classification Search

CPC ................................ H04L 5/00; H04L 5/0057
USPC ........................................................ 370/329
See application file for complete search history.

(56) References Cited

U.S. PATENT DOCUMENTS

2009/0168722 A1 7/2009 Saifullah et al.
2010/0091907 A1* 4/2010 Noh et al. ..................... 375/302
2011/0305176 A1* 12/2011 Wentink ........................ 370/310
2014/0056205 A1 2/2014 Aboul-Magd et al.

OTHER PUBLICATIONS

"Draft Standard for Information Technology—Telecommunications and information exchange between systems—Local and metropolitan area networks—Specific requirements: Part 11: Wireless LAN Medium Access Control (MAC) and Physical Layer (PHY) specifications: Amendment 4: Enhancements for Very High Throughput for Operation in Bands below 6 GHz," IEEE P802.11ac/D3.0, Jun. 2012, 385 pages.
International Search Report received in Application No. PCT/US13/67121, Applicant: Huawei Technologies Co., Ltd., mailed Mar. 19, 2014, 10 pages.

* cited by examiner

*Primary Examiner* — Sai-Ming Chan
(74) *Attorney, Agent, or Firm* — Slater & Matsil, L.L.P.

(57) ABSTRACT

Embodiments are provided herein for implementing a user cooperation protocol for interference alignment (IA) in wireless local area network (WLAN) or a Wi-Fi hotspot. The embodiments allow collecting knowledge of the channels from user stations (STAs) and sending this information to the corresponding access points (APs) in the network. This information is then used by the APs to pre-code their signals such as to remove interfering signals to non-intended STAs. An AP transmits to the STAs a group identifier (GrpID) indicating an order of STAs for transmitting channel state information (CSI) and an AP index indicating an order of STA groups of the APs for transmitting the CSI. When a STA detects a CSI transmission from another STA preceding the STA in the order of transmission as indicated by the AP index and GrpID, the STA transmits its CSI.

20 Claims, 3 Drawing Sheets

SYSTEM AND METHOD FOR USER COOPERATION PROTOCOL FOR INTERFERENCE ALIGNMENT IN WIRELESS NETWORKS

This application claims the benefit of U.S. Provisional Application No. 61/719,808 filed on Oct. 29, 2012 by Osama Aboul-Magd et al. and entitled "System and Method for User Cooperation in a Wireless Network," which is hereby incorporated herein by reference as if reproduced in its entirety.

TECHNICAL FIELD

The present invention relates to the field of wireless network communications, and, in particular embodiments, to a system and method for user cooperation protocol for interference alignment in wireless networks.

BACKGROUND

Interference alignment (IA) is a multi-device transmission method in which interfering transmitters pre-code their signals in the unwanted users' receiver space. Specifically, the wanted receiver's space is maximized and the unwanted receiver's space is minimized in terms of the signal to noise ratio (SNR) for transmission. This allows the receivers to completely cancel more interferers and successfully acquire signals intended for them. To successfully implement IA in a wireless network, knowledge of the channels between interfering devices is collected and distributed among these devices. In a WiFi or wireless local area network (WLAN) system, multiple access points (APs) may employ the IA method using channel state information (CSI) of user stations (STAs) to guarantee that the STAs receive the signals substantially without signal interference from unintended or non-corresponding transmitters (transmitting APs). In the case of multiple or collaborative AP transmissions, IA can be improved by channel state information (CSI) feedback from all the STAs to all the APs. Thus, an efficient scheme for exchanging the STAs' CSI is needed, for example to handle more STAs and/or APs in the network

SUMMARY OF THE INVENTION

In accordance with an embodiment, a method implemented by a network component for user cooperation for interference alignment in a wireless network includes transmitting, to a plurality of user stations (STAs), a group identifier (GrpID) indicating an order of STAs for transmitting channel state information (CSI). The method further includes transmitting, with the GrpID, an access point (AP) index indicating an order of multiple APs. The AP index further indicates an order of STA groups of the APs for transmitting the CSI. The order of STA groups corresponds to the order of APs.

In accordance with another embodiment, a method implemented by a STA for user cooperation for interference alignment in a wireless network includes receiving, from the wireless network, a GrpID indicating an order of STAs for transmitting CSI, and determining, according to the GrpID, an order of the STA to transmit CSI. The STA then detects a CSI transmission from another STA of the STAs, and determines that the other STA precedes the STA in the order of STAs as indicated by the GrpID. Thus, the STA transmits its CSI.

In accordance with another embodiment, a network component for user cooperation for interference alignment in a wireless network includes at least one processor and a non-transitory computer readable storage medium storing programming for execution by the at least one processor. The programming includes instructions to transmit, to a plurality of STAs, a GrpID indicating an order of STAs for transmitting channel state information (CSI). The network component is further configured to transmit, with the GrpID, an AP index indicating an order of APs and a corresponding order of STA groups of the APs for transmitting the CSI.

In accordance with yet another embodiment, a user device for user cooperation for interference alignment in a wireless network includes at least one processor and a non-transitory computer readable storage medium storing programming for execution by the at least one processor. The programming includes instructions to receive, from the wireless network, a GrpID indicating an order of STAs for transmitting CSI, and determine, according to the GrpID, an order of the STA to transmit CSI. The programming further includes instructions to detect a CSI transmission from another STA of the STAs, and determine that the other STA precedes the STA in the order of STAs as indicated by the GrpID. In this case, the user device is configured to transmit its CSI to an associated AP or broadcast the CSI.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the WLAN environment, it is usually the case that the number of spatial streams (Nss) at the APs exceeds the number of antennas at the STA. In these cases, the performance of IA can be enhanced significantly by allowing STAs to exchange channel estimation information (CSI) with each other, referred to herein as user cooperation. Embodiments are provided herein for implementing a user cooperation protocol for IA in wireless networks. The embodiments allow collecting knowledge of the channels from the STAs and sending this information to the APs. This information can then be used by the APs to pre-code their signals such as to remove (or substantially cancel) interfering signals to non-intended devices or STAs. A group ID, indicating a set of ordered STAs associated with an AP, is used to determine the order for transmitting channel measurement or CSI reports by the STAs. Further, an AP index can be used to rank the APs for determining the order of transmitting the CSI for multiple APs that have corresponding group ID spaces.

Figure 1:
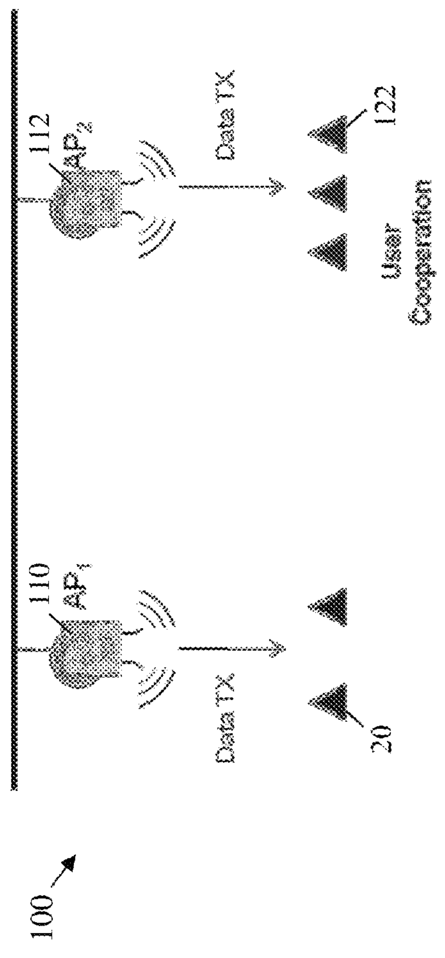
FIG. 1 illustrates a scenario for CSI transmission from STAs.

FIG. 1 shows a scenario 100 for CSI transmission from first STAs 120 and second STAs 122. The first STAs 120 receive corresponding data from a first AP 110. The second STAs 122 receive corresponding data from a second AP 112. The STAs 120 may be any of various devices, such as a cell phone, laptop, tablet, smart sensor, handheld or consumer electronic device, and other user devices that have a Wi-Fi (or IEEE 802.11) interface that can interact with a Wi-Fi network. These devices also may be able to interact with other types of communication networks, such as a cellular network. The APs provide the connected STAs access to a service provider network to provide various services (e.g., IP data services) to the STAs. To achieve downlink (DL) IA alignment, the first AP 110 pre-codes its transmitted data to the first STAs 120 such that interfering signals from the first AP 110 to the second STAs 122 are avoided. Similarly, the second AP 112 pre-codes its transmitted data to the second STAs 122 such that interfering signals from the second AP 112 to the first STAs 120 are avoided. To implement such IA operation, each one of the first AP 110 and second AP 112 needs to collect the CSI from all the STAs, including the first STAs 120 and second STAs 122. Each one of the first AP 110 and second AP 112 uses the CSI from all the STAs to select a subset of the STAs to target their transmissions using IA. The selected STAs need to be notified of the pending APs' transmissions. Following the channel estimation phase and the selection of target stations, the APs start transmitting data frames to the STAs. The data frames include in their PHY headers enough information to allow the STAs further channel estimation, if needed.

In IEEE 802.11ac, the concept of Group Identifiers (GrpID) was introduced to support downlink multi-user multiple-input and multiple-output (DL MU-MIMO). The GrpID is carried in the PHY header (in the SIGNAL field of the PHY header) from the AP that is decoded by all STAs. In one implementation, a GrpID defines a number of 4 STAs, for example, each which represent potential recipients. The GrpID also defines the order of each STA in the set to transmit data. Each STA can have a maximum of one position (e.g., first, second, third, or fourth) in every GrpID. The APs can transmit a plurality of GrpIDs, each defining a set of ordered STAs with a corresponding order. For example, GrpID 1 may define a set of 4 STAs at a first order, and GrpID 2 may define a set of the same 4 STAs but at a different order. Thus, when an STA receives a certain GrpID, the STA knows its order for transmitting data in that certain GrpID.

Figure 2:
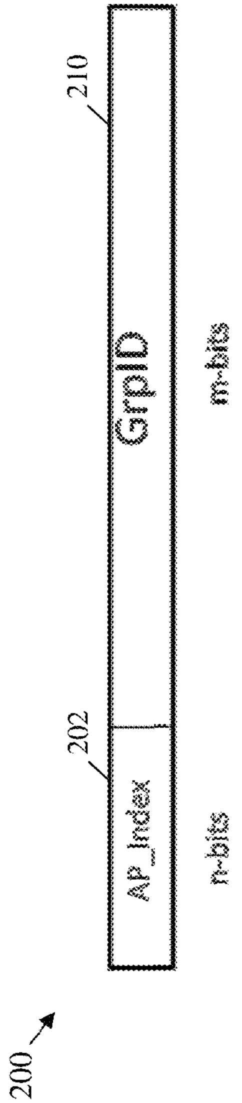
FIG. 2 illustrates an embodiment of a generalized GrpID for grouping and ordering STAs for CSI transmission.

In an embodiment, a GrpID is sent to the STAs to determine the order of the STAs to transmit or broadcast their CSI. However, unlike DL MU-MIMO where a single AP is involved, downlink IA involves multiple APs and any number of STAs, e.g., more than 4 stations. In an embodiment, a generalized GrpID is used to facilitate IA and to help reducing the protocol overhead. FIG. 2 shows an embodiment of a generalized GrpID 200 combining AP index and group ID for grouping and ordering STAs for CSI feedback. The generalized GrpID 200 is a combination of n-bit AP index 202 and an m-bit Group Identifier (GrpID) 210.

The AP index 202 indicates an AP rank or order, for instance as described in U.S. application Ser. No. 13/953,378 filed Jul. 29, 2013 by Osama Aboul-Magd et al. and entitled "System and method for a collaborative service set," which is hereby incorporated herein by reference as if reproduced in its entirety. In the generalized GrpID 200, each AP index 202 value indicates a certain ranking or ordering of the APs according to which the STAs associated with the APs transmit their CSI. For each AP in turn, as indicated by the AP index 202, the GrpID 210 value indicates the ordering of the APs' associated STAs for transmitting CSI. For example, if the AP index 202 indicates a first AP followed by a second AP, then the STAs of the first AP transmit their CSI before the STAs of the second AP. Further, each of the STAs of the first AP and subsequently the STAs of the second AP transmit their CSI according to the STA order indicated by the GrpID 210. Thus, the STAs first determine their turn for CSI transmissions according to the AP index 202 indicating the AP order among APs, and then according to the GrpID 210 indicating each STA order among the STAs.

This generalized GrpID field 200 can be assigned to participating STAs, by a designated AP controller in the network or by the member APs. Similar to IEEE802.11ac, the generalized GrpID field 200 can be included in the SIGNAL field of the PHY header, and has a length of n+m bits, where n and m are chosen integers. When a global GrpID space is used or shared among multiple APs, the GrpID may be sufficient to determine the order of transmissions between the STAs, since the GrpID determines the order of all STAs for all APs. In the case of multiple GrpID spaces for multiple APs, where each AP is assigned a set of GrpIDs, the generalized GrpID is used to resolve the different GrpID spaces. In this case, the AP index indicates order of transmissions for STA groups with respect to AP ordering, and the GrpID indicates order of transmissions for each STA within an STA group for each AP.

Determining an order of STAs, using GrpID or generalized Group ID, reduces the amount of signaling overhead by eliminating the need for the APs to send poll messages to the STAs to trigger the transmission or broadcast of CSI from the STAs. Instead, each STA may use the GrpID or the generalized GrpID (combined AP index and GrpID) to determine its turn in transmitting its channel information. After the completion of the first data sequence, the STAs are aware of the generalized GrpID. The AP index in the generalized GrpID may indicate if a global GrpID space is used. For instance, a defined AP index value (e.g., a value of zero) indicates that a global GrpID space is used. In this case, the STAs start transmitting one after the other based on their order in the GrpID. When a global GrpID space is not used, e.g., then the STAs start transmitting their channel information based on the value of the AP index and the order of the STA in the corresponding GrpID, as described above. When it is the turn of a STA to transmit, the STA may wait for short inter-frame spacing (SIFS) and perform clear channel assessment (CCA) to make sure the wireless medium is idle, before beginning to transmit CSI.

Figure 3:
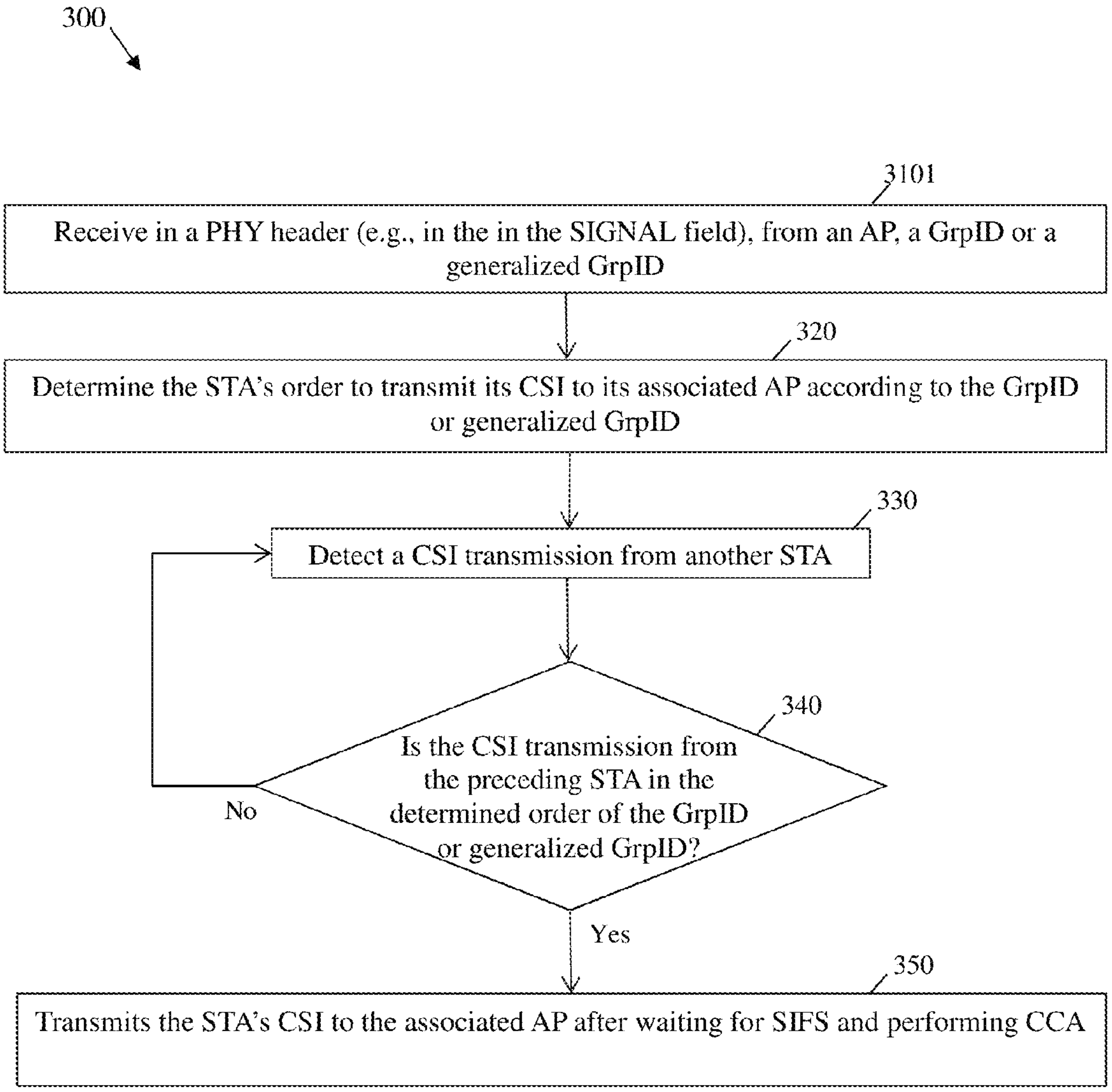
FIG. 3 illustrates an embodiment method for CSI feedback.

FIG. 3 shows an embodiment method 300 for CSI feedback using the scheme or protocol above. The method 300 is implemented by a STA in a multiple AP WLAN system. At step 310, a STA in a WLAN (or WiFi hotspot) receives in a PHY header (e.g., in the SIGNAL field), from an AP, a GrpID or a generalized GrpID. The STAs may receive the PHY header from their associated APs in the system. At step 320, the STA determines its order to transmit or broadcast its CSI to its associated AP according to the GrpID or generalized GrpID. In the case of using a generalized GrpID, the order of the STA is first determined by the rank or order of the AP associated with the STA, as indicated by the AP index. The STA order among the STAs associated with the AP is further determined by the GrpID value. At step 330, the STA detects a CSI transmission from another STA. At step 340, the STA determines whether the CSI transmission is from the preceding STA in the determined order of the GrpID or generalized GrpID. If this is true, then at step 350, the STA transmits its CSI to its AP after waiting for SIFS and performing CCA. Otherwise, the method 300 returns to step 330 to detect another CSI transmission from another STA.

Figure 4:
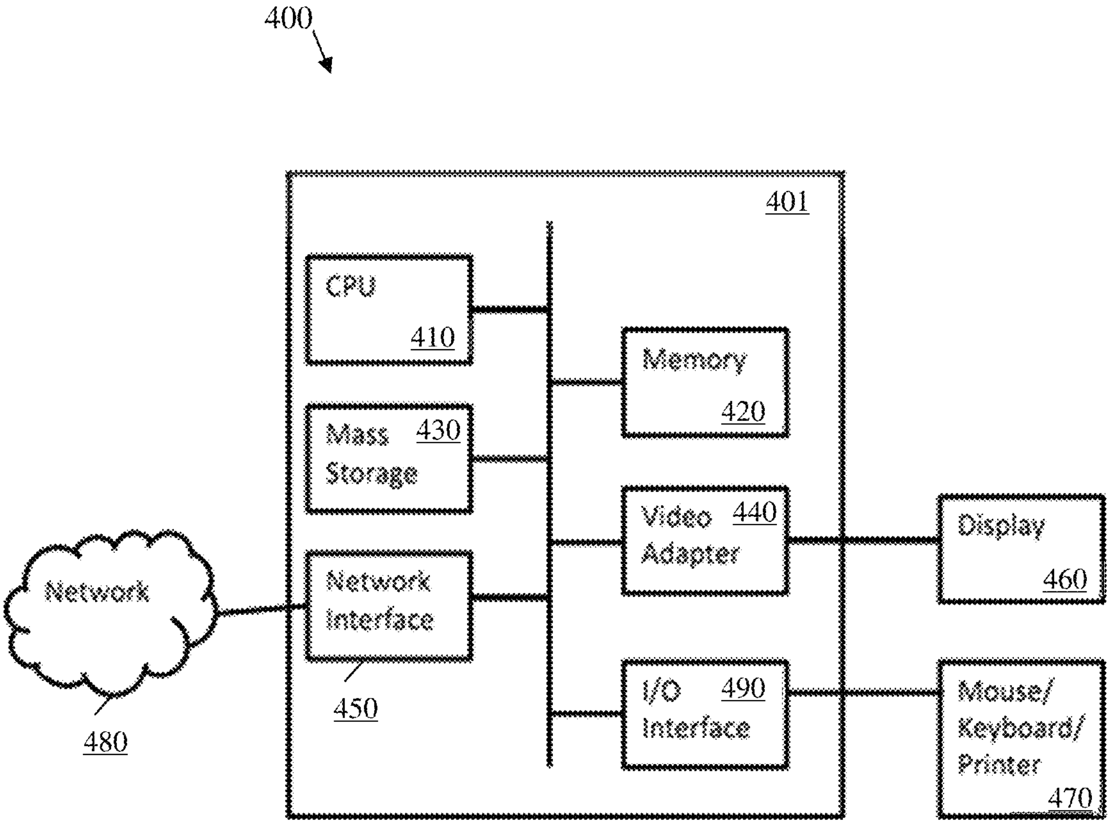
FIG. 4 is a diagram of a processing system that can be used to implement various embodiments.

FIG. 4 is a block diagram of an exemplary processing system 400 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a network interfaces, storage interfaces, and the like. The processing unit 401 may include a central processing unit (CPU) 410, a memory 420, a mass storage device 430, and an I/O interface 460 connected to a bus. The bus may be one or more of any type of several bus architectures including a memory bus or memory controller, a peripheral bus or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component for user cooperation for interference alignment in a wireless network, the method comprising:
- transmitting, by the network component, a group identifier (GrpID) to a plurality of user stations (STAs), the GrpID indicating an order of STAs for transmitting channel state information (CSI); and
- transmitting, with the GrpID, an access point (AP) index indicating an order of multiple APs.

2. The method of claim 1, wherein the AP index further indicates an order of STA groups of the multiple APs for transmitting the CSI, the order of STA groups corresponding to the order of APs.

3. The method of claim 1, wherein the GrpID and the AP index are carried in a SIGNAL (SIG) field of a physical layer (PHY) header.

4. The method of claim 1, wherein the GrpID is a global GrpID shared by the multiple APs, and wherein the AP index is equal to a defined value indicating the global GrpID.

5. The method of claim 1, wherein the multiple APs use multiple GrpID spaces, and wherein the AP index indicates an order of the GrpID spaces of the multiple APs according to the order of the multiple APs.

6. The method of claim 1, wherein the network component is an AP controller.

7. A network component for user cooperation for interference alignment in a wireless network, the network component comprising:
- at least one processor; and
- a non-transitory computer readable storage medium storing programming for execution by the at least one processor, the programming including instructions to:
  - transmit, to a plurality of user stations (STAs), a group identifier (GrpID) indicating an order of STAs for transmitting channel state information (CSI); and
  - transmit, with the GrpID, an access point (AP) index indicating an order of multiple APs.

8. The network component of claim 7, wherein the AP index further indicates an order of STA groups of the multiple APs for transmitting the CSI, the order of STA groups corresponding to the order of APs.

9. The network component of claim 7, wherein the GrpID and the AP index are transmitted in a SIGNAL (SIG) field of a physical layer (PHY) header.

10. The network component of claim 7, wherein the GrpID is a global GrpID shared by the multiple APs, and wherein the AP index is equal to a defined value indicating the global GrpID.

11. The network component of claim 7, wherein the multiple APs use multiple GrpID spaces, and wherein the AP index indicates an order of the GrpID spaces of the multiple APs according to the order of the multiple APs.

12. The network component of claim 7, wherein the network component is one of the multiple APs.

13. A method for facilitating user cooperation during interference alignment in a wireless network, the method comprising:

transmitting, by a network component, an access point (AP) index and a group identifier (GrpID) to mobile stations (STAs) in the wireless network, the GrpID being associated with at least a first group of STAs being served by a first access point (AP) and a second group of STAs being served by a second AP, wherein the GrpID specifies an order in which STAs in the first group of STAs transmit channel state information (CSI) in relation to other STAs in the first group of STAs, and an order in which STAs in the second group of STAs transmit CSI in relation to other STAs in the second group of STAs, and wherein the AP index specifies whether the first group of STAs transmit CSI before the second group of STAs, or vice versa.

14. The method of claim 13, wherein the GrpID and the AP index are carried in a SIGNAL (SIG) field of a physical layer (PHY) header.

15. The method of claim 13, wherein the network component is an AP controller.

16. The method of claim 13, wherein the network component is the first AP.

17. A network component comprising:

at least one processor; and a non-transitory computer readable storage medium storing programming for execution by the at least one processor, the programming including instructions to:

transmit an access point (AP) index and a group identifier (GrpID) to mobile stations (STAs) in a wireless network, the GrpID being associated with at least a first group of STAs being served by a first access point (AP) and a second group of STAs being served by a second AP, wherein the GrpID specifies an order in which STAs in the first group of STAs transmit channel state information (CSI) in relation to other STAs in the first group of STAs, and an order in which STAs in the second group of STAs transmit CSI in relation to other STAs in the second group of STAs, and wherein the AP index specifies whether the first group of STAs transmit CSI before the second group of STAs, or vice versa.

18. The network component of claim 17, wherein the GrpID and the AP index are carried in a SIGNAL (SIG) field of a physical layer (PHY) header.

19. The network component of claim 17, wherein the network component is an AP controller.

20. The network component of claim 17, wherein the network component is the first AP.

* * * * *